US008336633B2

(12) United States Patent
Worrall, Jr. et al.

(10) Patent No.: US 8,336,633 B2
(45) Date of Patent: Dec. 25, 2012

(54) SYSTEM AND METHOD FOR CONNECTING DEVICES IN A WELL ENVIRONMENT

(75) Inventors: Dan M. Worrall, Jr., Fulshear, TX (US); Robert Speer, Spring, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 250 days.

(21) Appl. No.: 12/770,072

(22) Filed: Apr. 29, 2010

(65) Prior Publication Data
US 2011/0266008 A1 Nov. 3, 2011

(51) Int. Cl.
*H02G 1/08* (2006.01)
(52) U.S. Cl. ...................... 166/385; 166/65.1
(58) Field of Classification Search ........... 166/385, 166/65.1, 66
See application file for complete search history.

(56) References Cited

U.S. PATENT DOCUMENTS

| 5,997,186 | A | 12/1999 | Huynh et al. | |
|---|---|---|---|---|
| 7,600,928 | B2 * | 10/2009 | Rubinstein et al. | 385/99 |
| 7,696,901 | B2 | 4/2010 | Wilson | |
| 2003/0111796 | A1 | 6/2003 | Kohli | |
| 2005/0213898 | A1 | 9/2005 | Rubinstein | |
| 2007/0062696 | A1 | 3/2007 | Wilson | |
| 2007/0237467 | A1 | 10/2007 | Rubinstein | |

OTHER PUBLICATIONS

PCT/US11/028762, filed on Mar. 17, 2011—International Search Report and written opinion dated Sep. 26, 2011.

* cited by examiner

*Primary Examiner* — William P Neuder
(74) *Attorney, Agent, or Firm* — Brandon S. Clark; Robert Van Someren

(57) ABSTRACT

A technique facilitates formation of communication line connections in a well environment. An electro-optic splitter enables communication line connections which comprise electrical conductor connections and optical fiber connections. The electro-optic splitter comprises a universal block which enables the electrical conductor and optical fiber to pass through the universal block while also enabling splitting of at least one of the electrical conductor and optical fiber for additional connection to one or more downhole gauges or other devices.

23 Claims, 7 Drawing Sheets

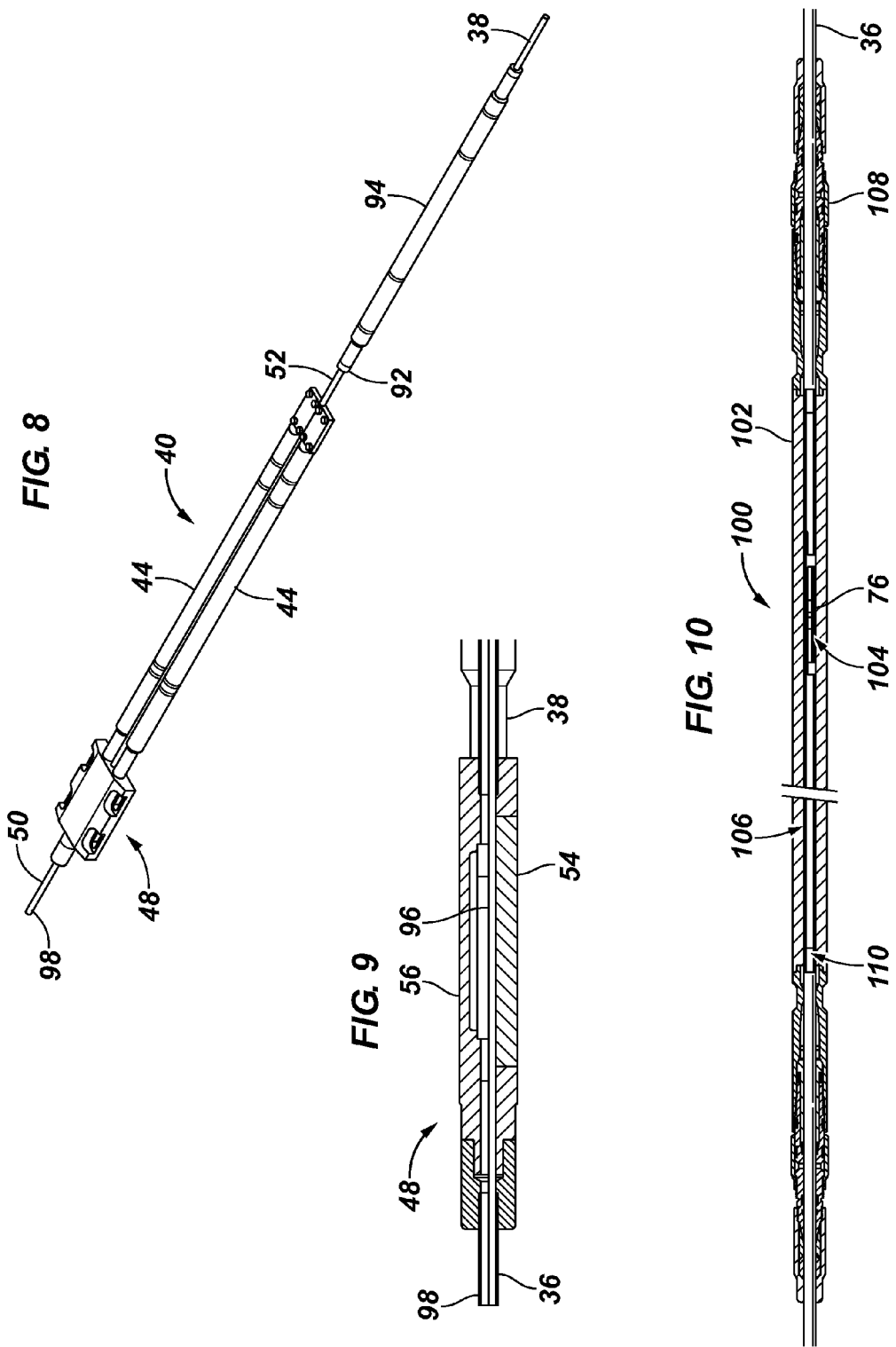

SYSTEM AND METHOD FOR CONNECTING DEVICES IN A WELL ENVIRONMENT

BACKGROUND

In many well applications, electrical conductors and optical fibers are used to convey signals in a downhole environment. For example, electrical conductors and optical fibers may be used to convey signals to and/or from devices positioned in a wellbore. Hybrid cables have been designed with electrical conductors and optical fibers combined in a single cable to enable transmission of signals, e.g. transmission of data, in electrical or optical form. The hybrid cable has an outer metal armor encapsulated in a plastic abrasion resistant coating to protect internal electrical conductors and optical fibers. When the hybrid cable is connected to downhole gauges, the internal electrical conductor or optical fiber is split out from the hybrid cable which can lead to detrimental complexities and susceptibility to contamination from the downhole environment.

SUMMARY

In general, the present invention comprises a system and methodology for forming communication line connections in a well environment. The communication line connections comprise electrical conductor connections and optical fiber connections which may be accomplished with an electro-optic splitter. The electro-optic splitter has a universal block which enables the electrical conductor and optical fiber to create a communication path through the universal block while also enabling splitting out of the electrical conductor and/or optical fiber for additional connection to one or more downhole devices, such as downhole gauges.

BRIEF DESCRIPTION OF THE DRAWINGS

Certain embodiments of the invention will hereafter be described with reference to the accompanying drawings, wherein like reference numerals denote like elements, and:

FIG. 8 is a schematic illustration of another embodiment of the electro-optic splitter, according to an alternate embodiment of the present invention;

FIG. 9 is a cross-sectional view of a portion of the electro-optic splitter, according to an embodiment of the present invention;

FIG. 10 is a cross-sectional view of one example of a hybrid cable splice that can be used in the electro-optic splitter, according to an embodiment of the present invention;

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The embodiments described below generally relate to a system and methodology for connecting downhole devices with communication lines. An electro-optic splitter is used in combination with a downhole system, such as a completion system, to enable the conveyance of signals to a plurality of well zones and/or sections of the completion while also allowing one or more communication lines to be "split out" for communication with other devices, such as downhole gauges. According to one embodiment, the electro-optic splitter facilitates deployment of one or more electrical and/or fiber optic gauges off of a hybrid cable. Additionally, the electro-optic splitter enables connection of segments of the hybrid cable that are on opposite sides, e.g. uphole and downhole, of the electro-optic splitter. In reverse usage, the electro-optic splitter also may be used to combine or couple a plurality of communication lines into a single hybrid cable.

Accordingly, the electro-optic splitter provides continuity of electrical and optic signals along the wellbore while also enabling communication of signals between the hybrid cable and one or more sensors, such as pressure gauges. For example, the electrical conductor and/or the optical fiber may be split out to carry signals to and/or from corresponding pressure gauges, such as electrical pressure gauges or fiber-optic pressure gauges. The electro-optic splitter also provides protection of the electrical and fiber optic connections from a surrounding well environment. In some applications, the electro-optic splitter enables deployment of a fiber distributed temperature sensor system without requiring running of separate cables in which one cable has a dedicated optical fiber and the other cable contains an electrical conductor (or a different optical fiber) for connection to gauges, e.g. pressure gauges, throughout the well completion.

In some applications, use of the hybrid cable with the electro-optic splitter enables data transmission from electrical gauges, fiber-optic gauges, and fiber distributed temperature sensors to be carried in a single metal jacketed cable. The ability to split out signal carriers from the hybrid cable for connection to corresponding gauges while also allowing for the electrical conductor and one or more optical fibers to be recombined and connected to a second hybrid cable decreases costs and reduces installation complexity.

Figure 1:
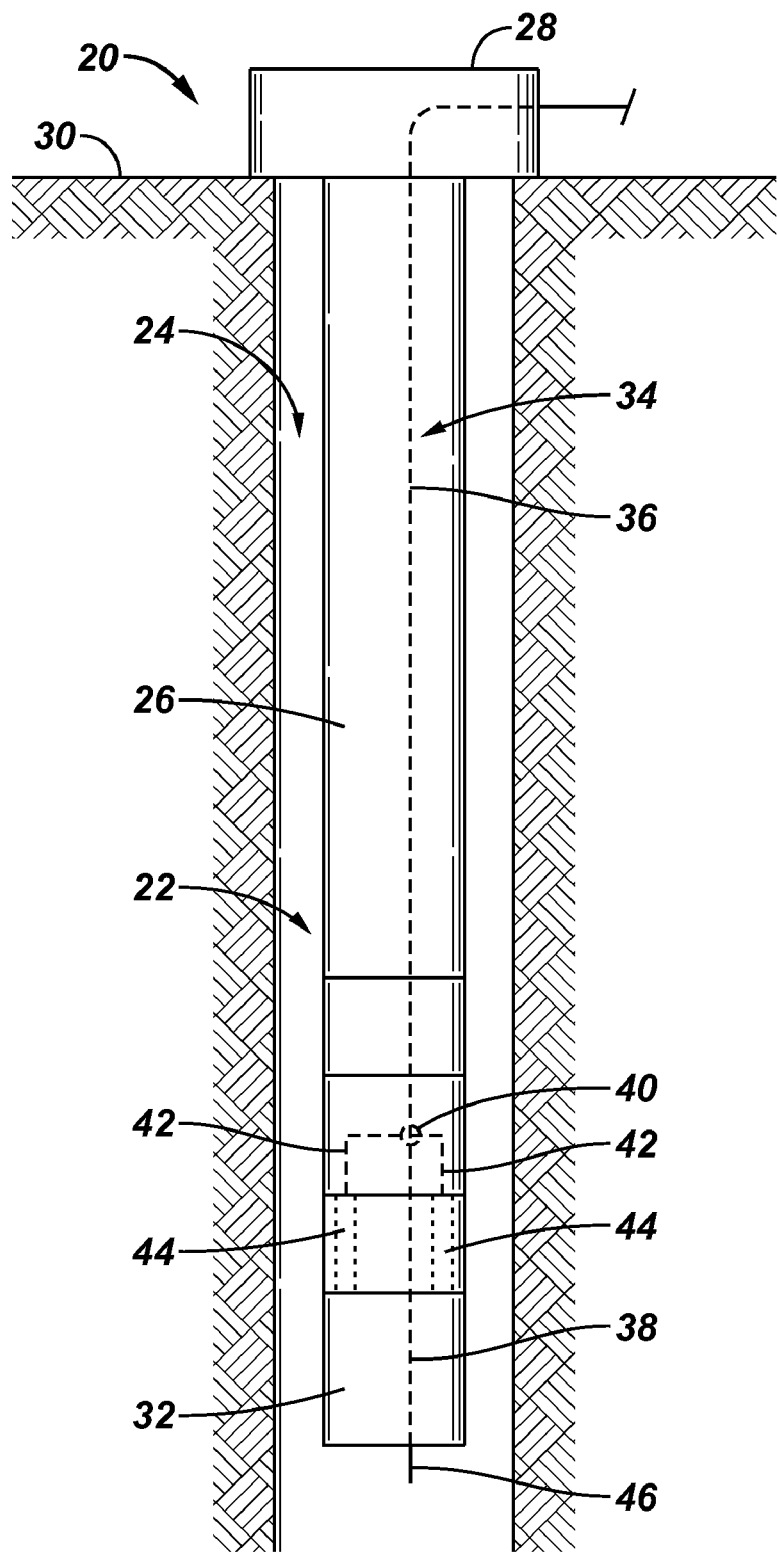
FIG. 1 is a schematic view of one example of a well system employing any electro-optic splitter, according to an embodiment of the present invention.

Referring generally to FIG. 1, one example of a well system 20 is illustrated as having a completion 22 positioned in a wellbore 24. The completion 22 may be deployed downhole by a suitable conveyance 26, such as coiled tubing or production tubing. The conveyance 26 extends downhole from appropriate surface equipment, such as a wellhead 28, positioned at a surface location 30.

The completion 22 may be constructed in numerous configurations with a variety of components. Generally, completion 22 comprises one or more devices 32 which receive and/or send electrical or optic signals via a hybrid cable 34 which may be a metal jacketed cable. Hybrid cable 34 also may be formed with cable segments 36, 38 on opposite sides of an electro-optic splitter 40. For example, cable segment 36 may be on an uphole side, i.e. closer to wellhead 28, of electro-optic splitter 40, and cable segment 38 may be on a downhole side of electro-optic splitter 40. Accordingly, an electrical conductor and an optical fiber of hybrid cable 34 may be routed through the electro-optic splitter 40 for connection with one or more devices 32. However, the electro-optic splitter 40 also a splits out one or more signal carriers 42 which are connected to one or more other devices, such as gauges 44. According to one example, gauges 44 are pressure gauges that may be oriented to detect the pressure of regions internal and/or an external of completion 22. It should be noted that in some applications, at least one of the devices 32 may comprise a fiber distributed temperature sensor 46. It should also be noted the electro-optic splitter 40 may effectively be used in reverse to combine signal carriers 42 into the single hybrid cable 34, and this combination or coupling of communication lines may be useful in a variety of applications in which signals are transferred from a plurality of lines to a single cable.

Figure 2:
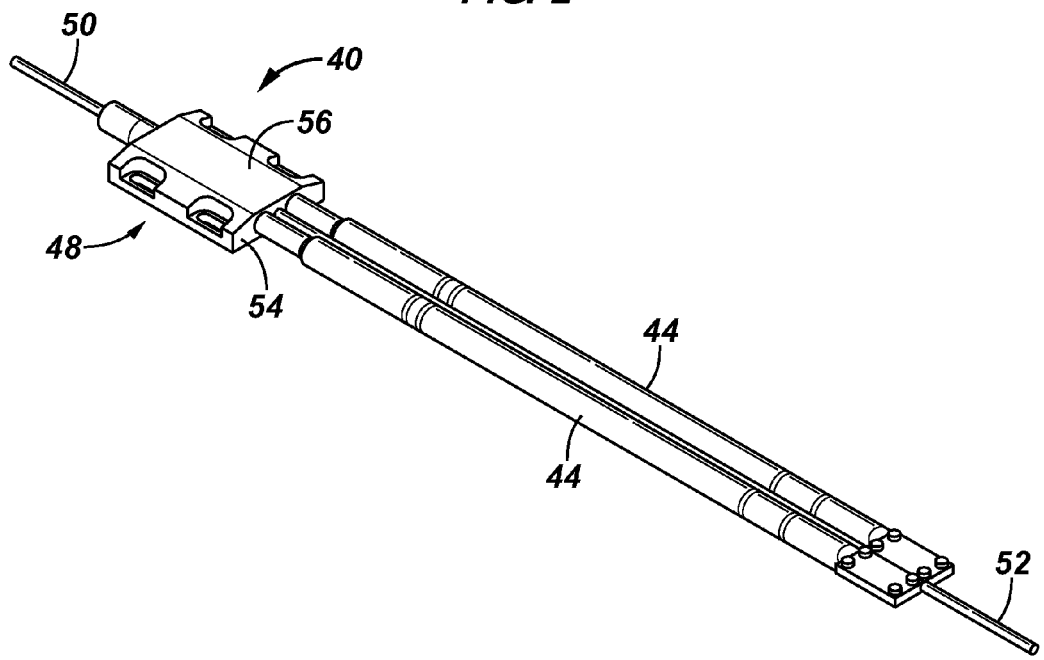
FIG. 2 is a schematic illustration of one embodiment of the electro-optic splitter illustrated in FIG. 1, according to an embodiment of the present invention.

Referring generally to FIG. 2, one embodiment of the electro-optic splitter 40 is illustrated as coupled to a pair of gauges 44. In this embodiment, the electro-optic splitter 40 comprises a universal block 48 which may be used to split at least one of the electrical conductor and the optical fiber into one or more signal carriers 42. In FIG. 2, universal block 48 is used to split off two signal carriers 42 which are coupled to two gauges 44, e.g. pressure gauges. The electro-optic splitter 40 further comprises a pair of transfer tubes 50 and 52 used to enclose and protect the one or more optical fibers and electrical conductors which extend through electro-optic splitter 40 and join hybrid cable segments 36 and 38. By way of example, transfer tube 50 may comprise an uphole transfer tube, and transfer tube 52 may comprise a downhole transfer tube. The transfer tubes 50, 52 are engaged with and sealed to universal block 48 by, for example, welding. However threaded engagements, press fit engagements, and other types of engagements may be used to form a sealed connection between universal block 48 and transfer tubes 50, 52.

Figure 3:
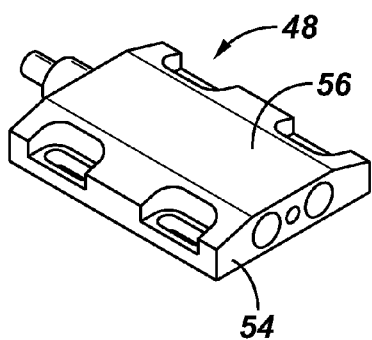
FIG. 3 is a schematic illustration of a universal block that may be used in the electro-optic splitter, according to an embodiment of the present invention.

As best illustrated in the example of FIG. 3, universal block 48 comprises a base structure 54 and a cap or cover 56 which is attached to the base structure 54. The cap 56 is used to seal and protect the various electrical and/or fiber optic connections from exposure to the surrounding wellbore environment. By way of example, cap 56 may be welded to base structure 54 after the various connections are formed. However, other methods of attachment, e.g. threaded engagement or adhesive, may be employed to connect and seal cap 56.

Figure 4:
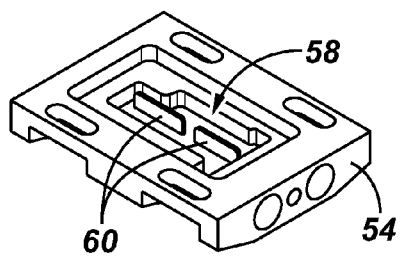
FIG. 4 is an illustration similar to that of FIG. 3 but showing the universal block with its cover removed, according to an embodiment of the present invention.

The shape and configuration of universal block 48 is selected to accomplish the desired internal connections. Generally, however, universal block 48 comprises an internal cavity 58 having a connector 60 designed to accommodate the desired connections, as illustrated in FIG. 4. In one embodiment, for example, the electrical conductors that extend through the corresponding hybrid cable segments 36, 38 are ultimately joined within universal block 48 by using a four-pin connector. As described in greater detail below, the transfer tubes 50, 52 may each have preinstalled electrical conductors that are joined within internal cavity 58 to connect hybrid cable segments 36, 38. However, connector 60 also may be utilized in connecting the split out signal carriers 42 and/or joining segments of optical fiber. In many applications, universal block 48 also is designed to accommodate passage of one or more optical fibers without forming a splice within universal block 48. After the desired connections are formed within universal block 48, internal cavity 58 is covered by cap 56 which seals the connections from the surrounding environment.

Figure 5:
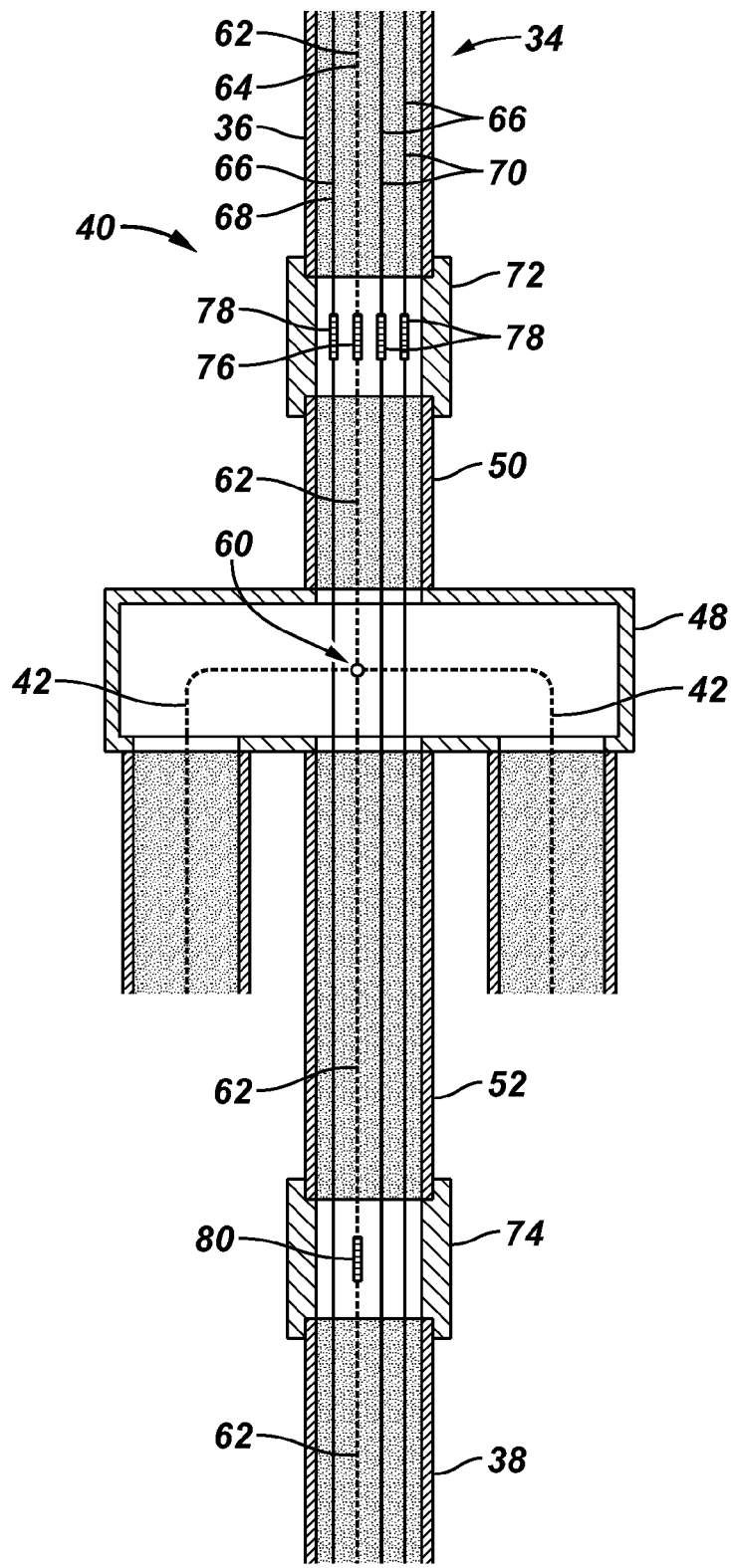
FIG. 5 is another schematic illustration of one embodiment of the electro-optic splitter, according to an embodiment of the present invention.

Referring generally to FIG. 5, a schematic representation is provided to illustrate one embodiment of the electro-optic splitter 40 engaged with cable segments 36, 38 of hybrid cable 34. In this embodiment, electrical conductor segments 62 are preinstalled in the transfer tubes 50, 52 for connection with corresponding electrical conductor segments 62 of cable segments 36, 38 to form an electrical conductor 64 extending through electro-optic splitter 40. The conductor segments 62 preinstalled in transfer tubes 50, 52 are joined in universal block 48 at connector 60, which also may be used to split off/combine the signal carriers 42 that are connected to gauges 44 or other devices. In this particular embodiment, signal carriers 42 are split from the electrical conductor, but one or more signal carriers 42 also may be split from a desired optical fiber routed through universal block 48. Depending on the application, one or more electrical conductors 64 and optical fibers 66 may be routed through electro-optic splitter 40. In the specific example illustrated, three optical fibers 66 are illustrated in which one of the optical fibers is a single mode fiber 68 and two of the optical fibers are multimode fibers 70. The one or more optical fibers 66 may be disposed in a protective tube positioned through universal block 48.

In the embodiment illustrated, the electrical and fiber optic communication lines 64, 66 are connected to hybrid cable segment 36 via a connector 72. Similarly, electrical and fiber optic communication lines 64, 66 are connected to hybrid cable segment 38 via an additional connector 74. By way of example, electrical conductor segments 62 may be joined within connector 72 by an electrical crimp 76, and segments of optical fiber 66 may be joined in connector 72 via fiber-optic fusion splices 78. In this embodiment, electrical conductor segments 62 also are joined within connector 74 via an electrical crimp 80.

Depending on the application and the specific design of electro-optic splitter 40, connectors 72 and 74 may vary in structure and function. By way of one specific example, connector 72 comprises a full hybrid cable splice (HCS) and the connector 74 comprises an electrical dry-mate connector (EDMC) splice, such as an electrical dry-mate connector-redundant (EDMC-R) splice. With either of these splice types, redundant metal-metal sealing is employed to provide a secure connection protected from exposure to the harsh, external well environment. It should be noted, however, that the connectors may be reversed; supplemental connectors may be added; the connector type may be changed to accommodate specific applications; and other changes may be made to accommodate different numbers of electrical and/or fiber optic communication lines.

Figure 6:
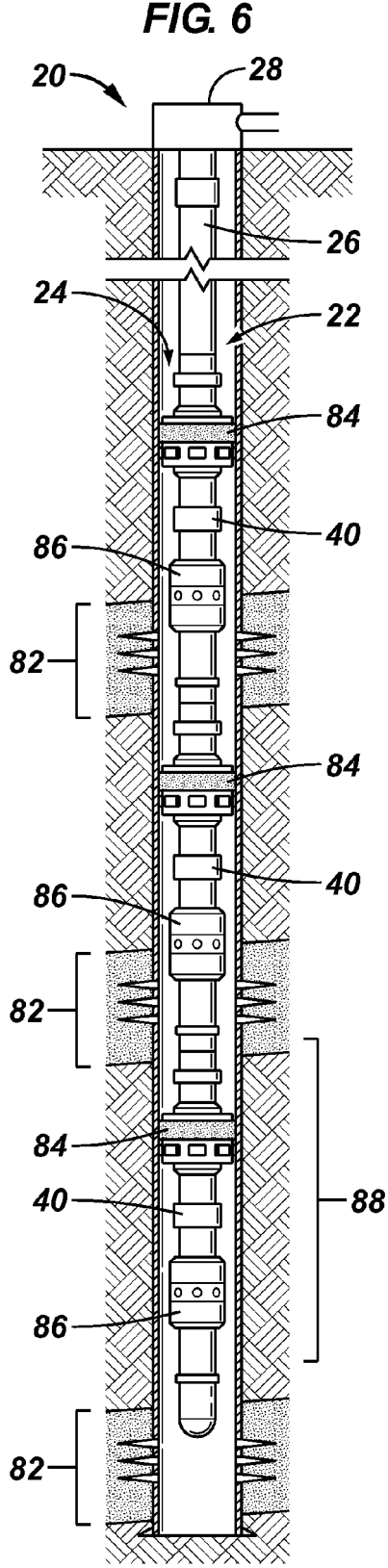
FIG. 6 is a schematic illustration showing employment of the electro-optic splitter in one example of a downhole completion, according to an embodiment of the present invention.
Figure 7:
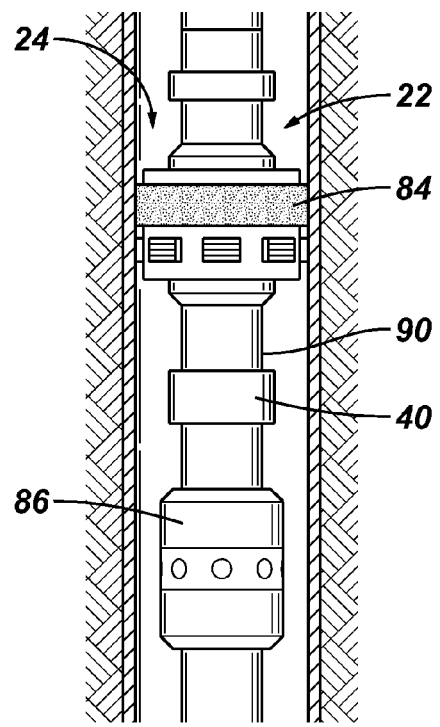
FIG. 7 illustrates an enlarged portion of the downhole completion illustrated in FIG. 6, according to an embodiment of the present invention.

Referring generally to FIG. 6, one embodiment of well system 20 is illustrated. In this embodiment, completion 22 is deployed along a plurality of well zones 82 and comprises a plurality of packers 84 to segregate the various well zones along wellbore 24. In each zone, an electro-optic splitter 40 is disposed between the corresponding packer 84 and a flow control valve 86, as illustrated best in the expanded view of FIG. 7. FIG. 7 illustrates the portion of completion 22 marked by reference character 88 in FIG. 6. It also should be noted that electro-optic splitter 40 may be used at single locations or multiple locations between a variety of completion components other than the packer and flow control valve. In one example, the electro-optic splitter 40 is attached to a mandrel 90 designed to port gauges 44 to desired regions, such as to the interior of the tubing or to the annulus to detect pressure. Additionally, the hybrid cable 34 may be routed downhole through additional well zones and through additional electro-optic splitters for connection to an optical turnaround, additional pressure gauges, and/or other devices.

In FIGS. 8-10, examples of electro-optic splitter components are illustrated as options that help accommodate installation of the hybrid cable 34 and electro-optic splitter 40 in a variety of downhole applications. As illustrated in FIG. 8, universal block 48 may be employed to split out signal carriers for connection to a pair of electrical pressure gauges 44. The universal block 48 also allows the electrical conductor and one or more optical fibers to be routed through transfer tube 52 from transfer tube 50. At a distal end 92 of transfer tube 52, the transfer tube and internal electrical conductor are joined to the downhole cable segment 38 via an EDMC-R splice 94 which provides a secure connection while protecting the internal communication lines from the surrounding wellbore environment.

In this particular example, universal block 48 comprises an internal transfer tube 96, as illustrated in FIG. 9. The one or more optical fibers 66 may be routed through internal transfer tube 96 which provides protection for the optical fibers. However, internal transfer tube 96 also facilitates installation of electro-optic splitter 40 between desired components of completion 22, as explained in greater detail below.

On an opposite side of universal block 48 from EDMC-R splice 94, a distal end 98 of transfer tube 50 and its internal electrical conductor and optical fibers are joined to the uphole cable segment 36 via a full hybrid cable splice 100. Although a variety of full hybrid cable splices may be employed, one example of hybrid cable splice 100 is illustrated in FIG. 10. In the specific example illustrated, full HCS 100 comprises a hybrid cable splice housing 102 enclosing a boot assembly 104 for forming electrical conductor crimp 76. The housing 102 also may enclose a slotted tube 106 which, in some applications, is filled with a gel, such as Sepigel™. The hybrid cable splice housing 102 also is engaged at one end with an EDMC-R cable seal assembly 108 while having a hybrid cable core 110 at an opposite end of the housing. These components may be designed to provide a secure metal-metal seal that protects the spliced communication lines from exposure to the external well environment. However, it should be noted that the specific parts and arrangement of parts in the full hybrid cable splice 100 may be adjusted to accommodate a variety of connections.

Although several installation procedures may be employed to connect each electro-optic splitter 40, the components illustrated and described with reference to FIGS. 8-10 facilitate a unique installation for various applications. According to one example of an installation procedure, the downhole hybrid cable segment 38 is cut to a suitable length so that it extends past the location of the electro-optic splitter 40. A metal jacket of the hybrid cable is then removed to expose the electrical conductor(s) 64 and optical fiber(s) 66 inside. The optical fiber is then pushed through the electro-optic splitter 40, starting at the lower transfer tube 52 and continuing through internal tube 96 and upper transfer tube 50 until the optical fiber 66 protrudes from the top or distal end 98 of uphole transfer tube 50.

The electrical conductor from the downhole hybrid cable segment 38 is then spliced to the preinstalled connector segment 62 in the downhole transfer tube 52. By way of example, the EDMC-R splice 94 may be installed between the downhole transfer tube 52 and the downhole hybrid cable segment 38. This provides a high-pressure seal between the two metal jackets to isolate the interior of the electro-optic splitter 40 from the surrounding well environment.

At the top end 98 of the uphole transfer tube 50, the optical fiber 66 and electrical conductor 64 protrude slightly. A full hybrid cable splice 100 may then be employed to splice the downhole fiber(s) and downhole electrical conductor to the uphole hybrid cable segment 36. The hybrid cable splice 100 may be designed to provide the same EDMC-R based sealing between the uphole transfer tube 50 and the uphole hybrid cable segment 36 via, for example, EDMC-R cable seal assembling 108. However, other types of well completions 22 and well applications may benefit from different arrangements of the electro-optic splitter 40.

Figure 11:
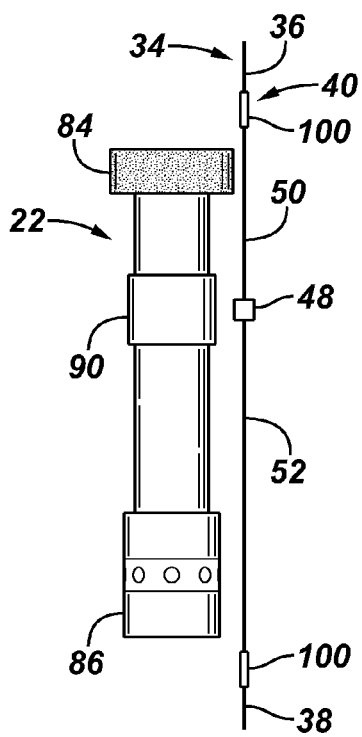
FIG. 11 is a schematic illustration of another embodiment of the electro-optic splitter, according to an alternate embodiment of the present invention.
Figure 12:
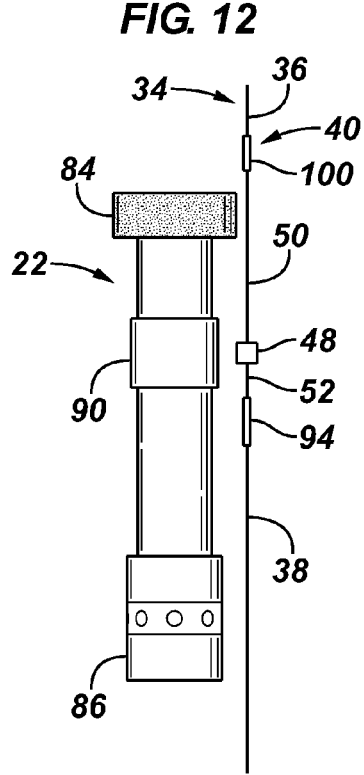
FIG. 12 is a schematic illustration of another embodiment of the electro-optic splitter, according to an alternate embodiment of the present invention.
Figure 13:
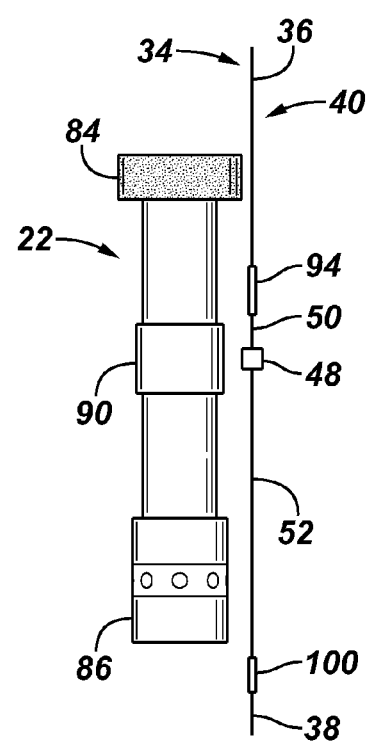
FIG. 13 is a schematic illustration of another embodiment of the electro-optic splitter, according to an alternate embodiment of the present invention.

Referring generally to FIGS. 11-13, alternate electro-optic splitter configurations are illustrated. In FIG. 11, for example, the electro-optic splitter 40 is designed with both preinstalled electrical conductor segments and optical fiber segments. Consequently, full hybrid cable splices 100 are employed on both the uphole and downhole sides of the electro-optic splitter 40. In FIG. 12, an EDMC splice, such as EDMC-R splice 94, is employed on the downhole side while a full hybrid cable splice 100 is employed on the uphole side. This arrangement can be obtained by using the components and installation procedure described with reference to FIGS. 8-10. Another embodiment is illustrated in FIG. 13 in which the layout of the electro-optic splitter 40 is reversed relative to the arrangement in FIG. 12. In this arrangement, only an electrical splice is performed on the uphole side of the electro-optic splitter 40 and continuous fiber is run down through electro-optic splitter 40 from uphole hybrid cable segment 36. Both the electrical conductor and the optical fibers are spliced on the downhole side of the electro-optic splitter 40. Consequently, an EDMC splice, such as EDMC-R splice 94, may be employed on the uphole side while a full hybrid cable splice 100 is employed on the downhole side.

Figure 14:
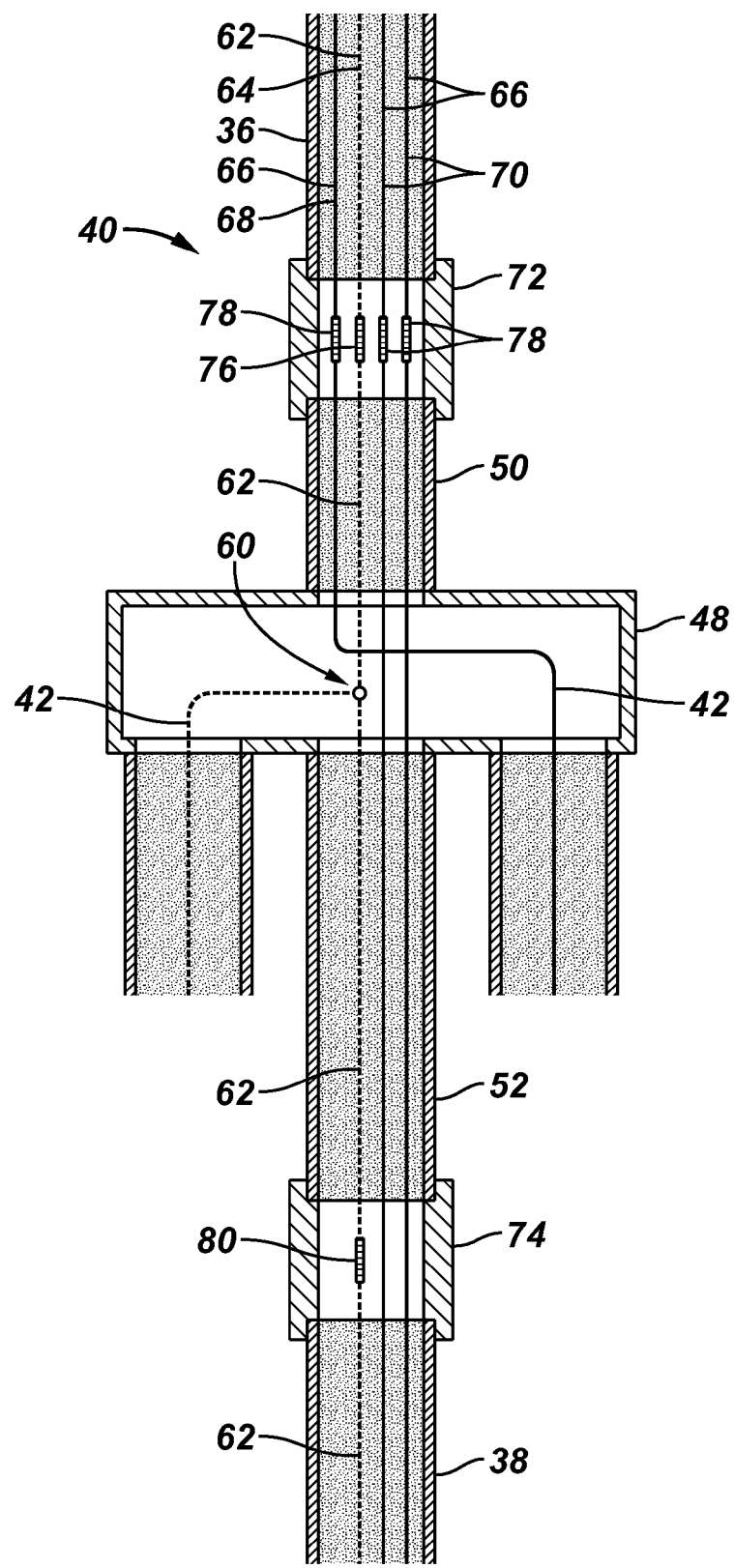
FIG. 14 is a schematic illustration of another embodiment of the electro-optic splitter, according to an alternate embodiment of the present invention.

Additionally, electro-optic splitter 40 may be designed to accommodate not only the splitting off of signal carriers for electrical gauges, but optical fibers may be directed to fiber optic gauges, such as fiber optic pressure gauges. In the alternate embodiment illustrated in FIG. 14, for example, universal block 48 is designed to route one of the optical fibers 66 to the optical fiber signal carrier 42 which enables connection to a desired gauge 44. In this example, the desired gauge 44 comprises a fiber-optic gauge, such as a fiber optic pressure gauge. The optical fiber signal carrier 42 may be preinstalled to run from a top of a fiber pressure gauge to a position where it may be directly spliced to the uphole hybrid cable along with, for example, optical fiber from downhole distributed sensor 46. As illustrated in the example of FIG. 14, the layout of electro-optic splitter 40 may be designed to accommodate both a fiber pressure sensor and an electrical pressure sensor or combinations of fiber/electrical devices.

The design of electro-optic splitter 40 enables a variety of potential gauge 44 combinations. Also, the electro-optic splitter 40 may be deployed with several gauge combinations; a connection to a downhole hybrid cable; and a full fiber splicing for a downhole fiber system, e.g. a fiber distributed temperature sensor system. The electro-optic splitter 40 may be designed for a single electrical pressure gauge, dual electrical pressure gauges, a single electrical pressure gauge and a single fiber pressure gauge, a single fiber pressure gauge, or dual fiber pressure gauges by employing the splice connections and fiber/electrical lines in various combinations of the arrangements discussed above.

The electro-optic splitter 40 also may be deployed at a bottom end of the completion 22 as, for example, a line termination with no further splice to a downhole cable segment. In such application, the electro-optic splitter 40 again may be employed with numerous gauge combinations. For example, the electro-optic splitter 40 may be used as a line termination with a single electrical pressure gauge, dual electrical pressure gauges, a single electrical pressure gauge and a single fiber pressure gauge, a single fiber pressure gauge, or dual fiber pressure gauges. Furthermore, the components, splices, universal block design, connectors, seals and other components may be adjusted as desired for a given well application in a given environment. Additionally, the electro-optic splitter 40 may be employed downhole at a single location or at multiple locations with a variety of completions and other types of downhole equipment employed in wellbore 24. The electro-optic splitter 40 is useful to split signals from a hybrid cable into a plurality of signals in corresponding communication lines; or to combine signals from the plurality of communication lines into signals carried via a single hybrid cable.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system for connecting devices in a well environment, comprising:
    a hybrid cable having an electrical conductor and an optical fiber;
    a plurality of downhole gauges; and
    an electric-optic splitter coupled to the hybrid cable, the electro-optic splitter comprising a universal block which forms a split connection between at least one individual electrical conductor or optical fiber and a plurality of signal carriers coupled to the plurality of downhole gauges, the electro-optic splitter further having an uphole transfer tube welded to the universal block to facilitate connection to the hybrid cable and a downhole transfer tube which facilitates engagement of the electro-optic splitter with a downhole hybrid cable, and wherein the universal block comprises an internal tube through which the optical fiber is routed from the downhole hybrid cable.

2. The system as recited in claim 1, wherein the universal block comprises an internal cavity sized to enable formation of electrical connections of the signal carriers.

3. The system as recited in claim 2, wherein the universal block further comprises a cap welded over the internal cavity to seal the electrical connections from a surrounding wellbore environment.

4. The system as recited in claim 1, wherein the plurality of gauges comprises a pair of electrical pressure gauges.

5. The system as recited in claim 1, wherein the plurality of gauges comprises an optical fiber pressure gauge.

6. The system as recited in claim 1, wherein the plurality of gauges comprises an electrical pressure gauge and an optical fiber pressure gauge.

7. The system as recited in claim 1, wherein the uphole transfer tube and the hybrid cable are joined at a full hybrid cable splice.

8. The system as recited in claim 7, wherein the downhole transfer tube and the downhole hybrid cable are joined at an electrical dry-mate connector.

9. The system as recited in claim 1, wherein the uphole transfer tube and the hybrid cable are joined at an electrical dry-mate connector.

10. The system as recited in claim 1, wherein the downhole transfer tube and the downhole hybrid cable are joined at a full hybrid cable splice.

11. A method of forming communication line connections in a well environment, comprising:
    forming an electro-optic splitter structure by coupling a universal block, having an internal cavity, with a first transfer tube and a second transfer tube;
    routing an electrical conductor and an optical fiber through the first transfer tube, the universal block, and the second transfer tube, wherein the optical fiber is routed through a tube internal to the universal block; and
    splitting at least one of the electrical conductors and the optical fiber into an additional signal carrier that extends from the internal cavity.

12. The method as recited in claim 11, further comprising coupling the electrical conductor and the optical fiber with a first hybrid cable at an end of the first transfer tube with a full hybrid cable splice.

13. The method as recited in claim 12, further comprising coupling the electrical conductor with a second hybrid cable at an end of the second transfer tube with an electrical dry-mate connector splice.

14. The method as recited in claim 11, further comprising coupling the electrical conductor and the optical fiber with a second hybrid cable at an end of the second transfer tube with a full hybrid cable splice.

15. The method as recited in claim 11, further comprising coupling the electrical conductor with a first hybrid cable at an end of the first transfer tube with an electrical dry-mate connector splice.

16. The method as recited in claim 11, wherein routing comprises connecting electrical conductor segments in the universal block, and wherein splitting further comprises connecting a plurality of signal carriers to a plurality of gauges.

17. A system, comprising:
    a completion string having a packer, a flow control valve, and an electro-optic splitter positioned between the packer and the flow control valve, the electro-optic splitter comprising a universal block which enables deployment of an electrical signal carrier and an optic signal carrier through the electro-optic splitter while splitting at least one of the electrical signal carrier and the optic signal carrier for connection to at least one downhole gauge, the universal block having an internal cavity to accommodate splitting of the at least one electrical signal carrier and optic signal carrier, the universal block further comprising a cover which seals the internal cavity from a surrounding wellbore environment.

18. The system as recited in claim 17, wherein the electro-optic splitter comprises a pair of transfer tubes coupled to the universal block.

19. The system as recited in claim 18, wherein the electro-optic splitter comprises a full hybrid cable splice at one transfer tube of the pair of transfer tubes and an electrical dry-mate connector splice at the other transfer tube of the pair of transfer tubes.

20. A method of forming a connection, comprising:
exposing an optical fiber and an electrical conductor of a downhole hybrid cable;
inserting the optical fiber through a lower transfer tube, a universal block, a tube internal to the universal block, and an upper transfer tube of an electro-optic splitter;
splicing the electrical conductor to a preinstalled conductor within the electro-optic splitter at one end of the downhole transfer tube;
connecting the optical fiber and the preinstalled conductor to an uphole hybrid cable at an end of the upper transfer tube; and
splitting the preinstalled conductor into a separate signal carrier in the universal block.

21. The method as recited in claim 20, further comprising coupling a gauge to the separate signal carrier.

22. The method as recited in claim 20, wherein splitting comprises splitting the preinstalled conductor into a plurality of separate signal carriers and coupling a plurality of gauges to the plurality of separate signal carriers.

23. The method as recited in claim 20, wherein connecting comprises splicing with a full hybrid cable splice.

* * * * *